(No Model.)
H. D. WILCOX.
CUTTER HEAD.
No. 290,158. Patented Dec. 11, 1883.
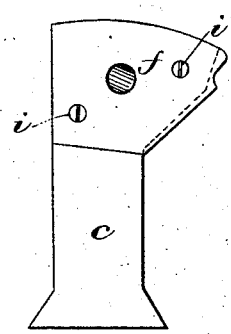
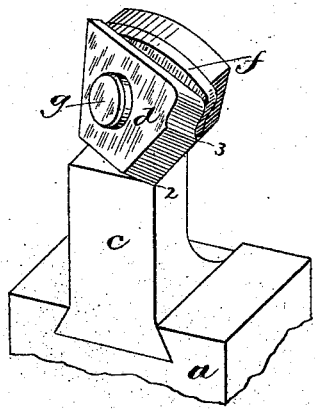
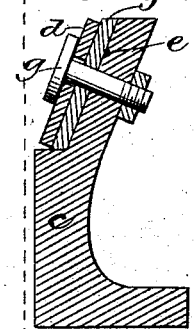
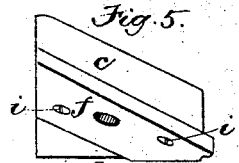
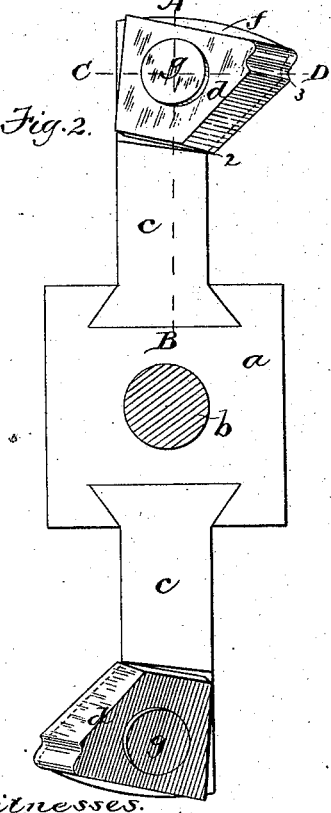
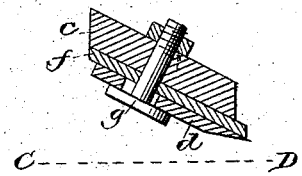
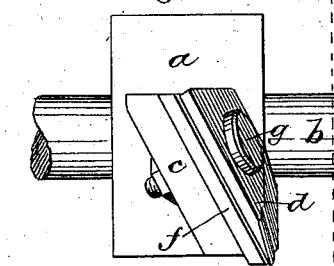
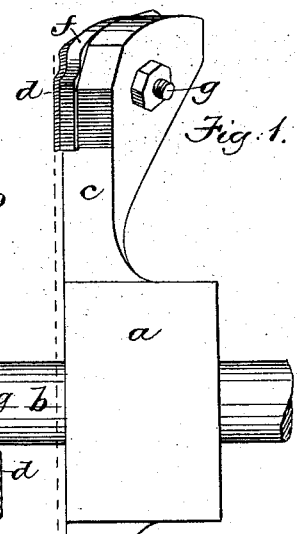
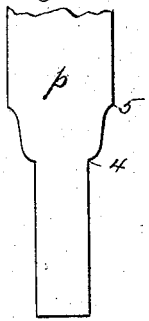

UNITED STATES PATENT OFFICE.

HEMAN D. WILCOX, OF BOSTON, MASSACHUSETTS.

CUTTER-HEAD.

SPECIFICATION forming part of Letters Patent No. 290,158, dated December 11, 1883.

Application filed October 8, 1883. (No model.)

*To all whom it may concern:*

Be it known that I, HEMAN D. WILCOX, of Boston, in the county of Suffolk and State of Massachusetts, have invented certain Improvements in Cutter-Heads, of which the following is a specification.

This invention has for its object to provide an improved cutter-head for panel-raising and other wood-working machines; and it consists, mainly, in the improved arrangement of the cutters, hereinafter described, whereby they are enabled to operate more easily and with better results than heretofore.

The invention also consists in the provision of a removable cap or guard for each cutter, said cap being found at one end to correspond to the outline of the cutting-edge of the cutter it accompanies, all of which I will now proceed to describe.

Of the accompanying drawings, forming a part of this specification, Figure 1 represents a front elevation of a cutter-head embodying my improvements. Fig. 1ª represents an end elevation of a cutter-head arranged as a companion to that shown in Fig. 1. Fig. 2 represents a side elevation of the cutter-head shown in Fig. 1. Fig. 3 represents a perspective view of a portion of the cutter-head. Fig. 4 represents a side elevation of an arm of the cutter-head with its cutter removed. Fig. 5 represents a top view of the part shown in Fig. 4. Fig. 6 represents a section on line A B, Fig. 2. Fig. 7 represents a section on line C D, Fig. 2. Fig. 8 represents a transverse section of a piece of material after being acted on by the cutters shown in the preceding figures. Fig. 9 represents a piece slightly differing from Fig. 8.

The same letters of reference indicate the same parts in all the figures.

In carrying out my invention, I provide a cutter-head having a central part or hub, $a$, affixed to an arbor, $b$, and one or more (preferably two) radiating arms, $c$, secured detachably or otherwise to said hub, the connection shown being by means of dovetail recesses in the hub, securing dovetail bases on the arms. My invention is entirely embodied in the arms $c$ and their cutters, and as said arms are exact duplicates of each other in the same head, a description of one will suffice. The arm has at its outer end a seat, $e$, for a blade or cutter, $d$. Said seat is inclined in two directions relatively to the plane of rotation of the cutter-head, one of said inclinations being diagonal to a line, A B, radiating from the axis of the cutter, as shown in Figs. 1 and 6, and the other being diagonal to a line, C D, which is at right angles with the line A B and with the axis of the cutter-head, as shown in Figs. 1 and 7. Upon the seat $e$, I place a detachable guard plate or cap, $f$, which has the same inclinations as the seat $e$, and constitutes the direct bearing for the cutter $d$, said cutter being secured to the arm by a bolt, $g$, passing through an orifice in the cap $f$. The cap is secured in position on the arm prior to the attachment of the cutter by pins or screws $i\,i$. (See Figs. 4 and 5.) The described inclinations of the seat $e$, giving the same inclinations to the cutter $d$, enable the cutting-edge of said cutter to be formed with a forward inclination from its inner end, 2, to its outer end, 3, the latter therefore always acting in advance of the former when the cutter-head rotates. I have found by long experience that this position of the cutting-edge produces the best results in panel-raising and other work on the sides of pieces of wood. The surfaces formed are much smoother than with any other arrangement of cutters of which I am aware, and changes in the direction of the grain of the wood, which, with other cutters, would cause splintering and rough work, have no effect with the cutters arranged as above described.

It will be seen that the portion of the cutting-edge which has the described forward inclination, when moved in a circular path by the rotation of the cutter-head, must effect a draw-cut in operating, the nature of the cut being the result of the inclination and movement of the cutting-edge. By increasing the degree of the inclination of the cutter with reference to the line A B, which may be termed its "transverse inclination," the length and forward inclination of the inclined position of the cutting-edge is correspondingly increased if said edge be formed to coincide absolutely or approximately with the plane in which it rotates, as shown in Fig. 1, (said plane being indicated by the dotted line on said figure.) It is obvious that the degree of the draw-cut increases with the length and forward inclination of the inclined portion of the cutting-edge. The drawing nature of the cut is the reason of its smooth and perfect nature.

The part 2 3 of the cutting-edge of the cutter shown in the drawings is the part that forms the surface 3 4 on the panel *p*, or other article treated. (See Fig. 8.) The remaining portion of the cutting-edge, which forms the portion 4 5, has in the present instance an ogee curve; but it is obvious that the form may be varied to suit the requirements of the work. For example, to produce the beveled portion 4 5 (shown in Fig. 9) the outer portion of the cutting-edge would require to be straight and form an obtuse angle with the portion 2 3.

The cap or guard, which is virtually a movable section of the arm *c*, has its forward edge formed to correspond with the cutting-edge of the cutter, as shown in dotted lines in Fig. 2, said cutting-edge being set slightly ahead of the cap, so that the cap governs the action of the cutter on the stock as the bottom of a plane governs the action of the cutter thereof. There will, of course, be a different cap for each form of cutter, so that the same arm *c* will serve for any number of cutters.

Although I have shown a cutter-head located on a horizontal axis, it is obvious that it may be on a vertical axis, and that the arm *c* may be held by the adjustable collars on the vertical arbor of a variety molding-machine, said arms being arranged to rotate in a horizontal plane.

I claim—

1. A rotary cutter-head having one or more cutters, each inclined in two directions, as described, relatively to the plane of rotation of the head, and having its cutting-edge inclined forward from its inner to its outer end, as set forth.

2. A rotary cutter head or arm provided with one or more seats, each inclined in two directions, as described, relatively to the plane of rotation of the head, as set forth.

3. A rotary cutter head or arm having one or more seats, each inclined in two directions, as described, relatively to the plane of rotation of the head, and provided with a removable cap or section adapted to directly support a cutter, as set forth.

4. The combination of a rotary cutter head or arm having an inclined seat, a cutter detachably secured to said head, and a detachable cap interposed between the cutter and seat, and having its forward edge correspondingly to the outline of the cutting-edge of the cutter, as set forth.

5. A rotary cutter head or arm having one or more cutters, each inclined in two directions, as described, relatively to the plane of rotation of the cutter-head, said cutter having a portion of its cutting-edge coinciding with said plane of rotation, and being thereby adapted to operate with a draw cut, as set forth.

In testimony whereof I have signed my name to this specification, in the presence of two subscribing witnesses, this 3d day of October, 1883.

HEMAN D. WILCOX.

Witnesses:
C. F. BROWN,
T. T. McNULTY.